US008387005B1

(12) United States Patent
Ghosh-Roy et al.

(10) Patent No.: US 8,387,005 B1
(45) Date of Patent: Feb. 26, 2013

(54) GENERATION OF MULTI-DOMAIN CODE FROM A GRAPHICAL PROGRAM

(75) Inventors: Rajiv Ghosh-Roy, Hudson, MA (US); Jonathan Raichek, Westford, MA (US)

(73) Assignee: The MathWorks, Inc., Natick, MA (US)

( * ) Notice: Subject to any disclaimer, the term of this patent is extended or adjusted under 35 U.S.C. 154(b) by 1027 days.

(21) Appl. No.: 12/326,297

(22) Filed: Dec. 2, 2008

(51) Int. Cl.
*G06F 9/44* (2006.01)

(52) U.S. Cl. ...................................... 717/109

(58) Field of Classification Search ................ None
See application file for complete search history.

(56) References Cited

U.S. PATENT DOCUMENTS

| | | | |
|---|---|---|---|
| 6,173,438 B1 * | 1/2001 | Kodosky et al. | 717/109 |
| 6,219,628 B1 | 4/2001 | Kodosky et al. | |
| 7,350,172 B1 | 3/2008 | Koh et al. | |
| 7,503,027 B1 | 3/2009 | Zhao et al. | |
| 7,689,970 B1 | 3/2010 | Englehart et al. | |
| 7,900,168 B2 | 3/2011 | Chugh et al. | |
| 7,945,894 B2 * | 5/2011 | Peck et al. | 717/109 |
| 7,974,825 B2 | 7/2011 | Linebarger et al. | |
| 7,983,879 B1 | 7/2011 | Vetsch et al. | |
| 8,015,543 B1 | 9/2011 | Carrick et al. | |
| 8,046,202 B1 | 10/2011 | Yang et al. | |
| 8,141,011 B1 | 3/2012 | Zhao et al. | |
| 8,156,481 B1 | 4/2012 | Koh et al. | |
| 2003/0196187 A1 * | 10/2003 | Kodosky et al. | 717/109 |
| 2003/0200076 A1 * | 10/2003 | Kodosky et al. | 703/22 |

OTHER PUBLICATIONS

"Real-Time Workshop® 6: User's Guide," The MathWorks, Inc., Mar. 2007, pp. i-xxii, 1-1 to 1-26, 2-1 to 2-142, 3-1 to 3-22, 4-1 to 4-68, 5-1 to 5-88, 6-1 to 6-44, 7-1 to 7-38, 8-1 to 8-38, 9-1 to 9-40, 10-1 to 10-92, 11-1 to 11-24, 12-1 to 12-42, 13-1 to 13-28, 14-1 to 14-10, 15-1 to 15-12, 16-1 to 16-40, 17-1 to 17-40, A-1 to A-4, B-1 to B-22, C-1 to C-4, and Index-1 to Index-11.
"Simulink® HDL Coder™ 1: User's Guide," The MathWorks, Inc., Mar. 2008, pp. i-xiv, 1-1 to 1-10, 2-1 to 2-36, 3-1 to 3-90, 4-1 to 4-10, 5-1 to 5-66, 6-1 to 6-18, 7-1 to 7-10, 8-1 to 8-22, 9-1 to 9-48, 10-1 to 10-82, 11-1 to 11-16, 12-1 to 12-10, 13-1 to 13-84, 14-1 to 14-26, A-1 to A-2, and Index-1 to Index-8.
"xPC Target 3: User's Guide," The MathWorks, Inc., Sep. 2007, pp. i-xiv, 1-1 to 1-8, 2-1 to 2-20, 3-1 to 3-80, 4-1 to 4-12, 5-1 to 5-14, 6-1 to 6-10, 7-1 to 7-8, 8-1 to 8-8, 9-1 to 9-18, 10-1 to 10-14, 11-1 to 11-12, 12-1 to 12-16, 13-1 to 13-20, 14-1 to 14-32, 15-1 to 15-8, 16-1 to 16-10, 17-1 to 17-168, and Index-1 to Index-5.
"Using the PCI Bus to Exchange Data with xPC," The MathWorks, Inc., 2006, pp. 1-3.
Bhatt, Tejas M., et al., "Matlab as a Development Environment for FPGA Design," ACM, Jun. 13-17, 2005, pp. 607-610.
"LabVIEW™: Embedded Development Module Porting Guide," National Instruments Corporation, Aug. 2007, pp. 1-210.
"LabVIEW™: FPGA Module User Manual," Version 1.1, National Instruments Corporation, Mar. 2004, pp. 1-62.
"Getting Started with the LabVIEW™ Embedded Module for ARM Microcontrollers 1.0: for the Keil MCB2300," National Instruments Corporation, Apr. 2008, pp. 1-16.

* cited by examiner

*Primary Examiner* — Philip Wang
(74) *Attorney, Agent, or Firm* — Cesari and McKenna, LLP; Michael R. Reinemann

(57) ABSTRACT

A system and method configures a target processing entity having multiple processing elements to execute a graphical program. A first part of the graphical program is designated for execution by a first processing element, and a second part of the graphical program is designed for execution by a second processing element. A code generation system generates a single build file from the graphical program having an initialization section, suitable executable code sections for each processing element, and a communication section that supports communication between the two processing elements. The build file may be downloaded to, and run by the target processing entity to implement the graphical program at the target processing entity.

16 Claims, 11 Drawing Sheets

GENERATION OF MULTI-DOMAIN CODE FROM A GRAPHICAL PROGRAM

BACKGROUND OF THE INVENTION

1. Field of the Invention

The present invention relates to code generation and, more specifically, to generating code from a graphical program.

2. Background Information

Engineers and scientists often use computer-based, high-level development tools or environments to perform algorithm development, data visualization, simulation, and model design, among other tasks. Exemplary high-level development tools include the MATLAB® and Simulink® technical computing environments from The MathWorks, Inc. of Natick, Mass. With the Simulink® technical computing environment, a user creates a graphical model by dragging and dropping blocks from a library browser onto a graphical editor, and connecting them with lines that establish mathematical relationships and/or signals among the blocks. Stateflow® modeling environment is an extension to the Simulink® technical computing environment that allows users to specify state machines and flow charts. A Stateflow chart may be created by dragging states, junctions and functions from a graphical palette into a drawing window. The user can then create transitions and flow by connecting states and junctions together.

Other add-on products or tools exist for generating code from Simulink models, MATLAB files and/or functions, often referred to as M-files, and/or Stateflow charts. Specifically, the Real-Time Workshop® add-on product, also available from The MathWorks, Inc., generates C or C++ code from Simulink models to create standalone implementations of models that operate in real-time and non-real-time in a variety of target environments, such as personal computers (PCs), workstations, Digital Signal Processors (DSPs), microcontrollers, etc. The Simulink Hardware Description Language (HDL) Coder™ add-on product from The MathWorks, Inc. generates HDL code based on Simulink models or Stateflow charts. The generated HDL code can be exported to synthesis and layout tools for hardware realization, such as Field Programmable Gate Arrays (FPGAs), Application Specific Integrated Circuits (ASICs), Complex Programmable Logic Devices (CPLDs), etc.

Furthermore, the xPC Target add-on product from The MathWorks, Inc. supports the prototyping, testing and deployment of real-time systems. More specifically, with the xPC Target add-on product, a user may deploy C or C++ code generated from a Simulink model to a target PC running a real-time kernel.

SUMMARY OF THE INVENTION

A computer-implemented method configures a target processing entity having a processor, a memory coupled to the processor and a programmable logic device coupled to the processor, to implement a graphical program representing a procedure. The method includes creating the graphical program having a plurality of interconnected blocks and defining a procedure, specifying a first portion of the graphical program for execution by the processor of the target processing entity, specifying a second portion of the graphical program for execution by the programmable logic device of the target processing entity, at least one block of the second portion of the graphical program connected to at least one block of the first portion of the graphical program, creating a single build file based on the first and second portions of the graphical program, the build file having an executable code section to implement the first portion of the graphical program, a communication interface section to implement the connection between the at least one block of the first portion with the at least one block of the second portion, and a configuration section to implement the second portion of the graphical program, downloading the single build file from the host computer to the target processing entity, executing the single build file by the processor of the target processing entity, the executing including storing the executable code section for execution by the processor in the memory of the target processing entity, establishing a communication interface between the processor and the programmable logic device based on the communication interface section, and, configuring the programmable logic device with the configuration section; and implementing the graphical program at the target processing entity based on the processing.

A system includes a target data processing entity having a processor, a memory coupled to the processor, and a programmable logic device coupled to the processor, and a host computer system having a host memory configured to store a graphical program having a plurality of interconnected blocks, the graphical program having a first portion for execution by the processor of the target data processing entity, and a second portion for execution by the programmable logic device of the target data processing entity, the second portion of the graphical program including at least one block that is connected to at least one block of the first portion of the graphical program, and a single build file of the graphical program that includes an executable code section configured to implement is the first portion of the graphical program, a communication interface section to implement the connection between the at least one block of the first portion with the at least one block of the second portion, and a configuration section to implement the second portion of the graphical program, and communication logic configured to download the single build file to the target data processing entity. The processor of the target data processing entity may be configured to execute the single build file to store in the memory of the target data processing entity the executable code section for execution by the processor of the target data processing entity, establish a communication interface between the processor and the programmable logic device based on the communication interface section, and configure the programmable logic device with the configuration section. The processor and the programmable logic device may be configured to cooperate to implement the graphical program at the target processing entity by executing the executable code section from the memory using the processor, executing the programmable logic device as configured, and the processor and the programmable logic device communicating across the communication interface.

BRIEF DESCRIPTION OF THE DRAWINGS

The invention description below refers to the accompanying drawings, of which.

DETAILED DESCRIPTION OF AN ILLUSTRATIVE EMBODIMENT

Overview

Figure 1:
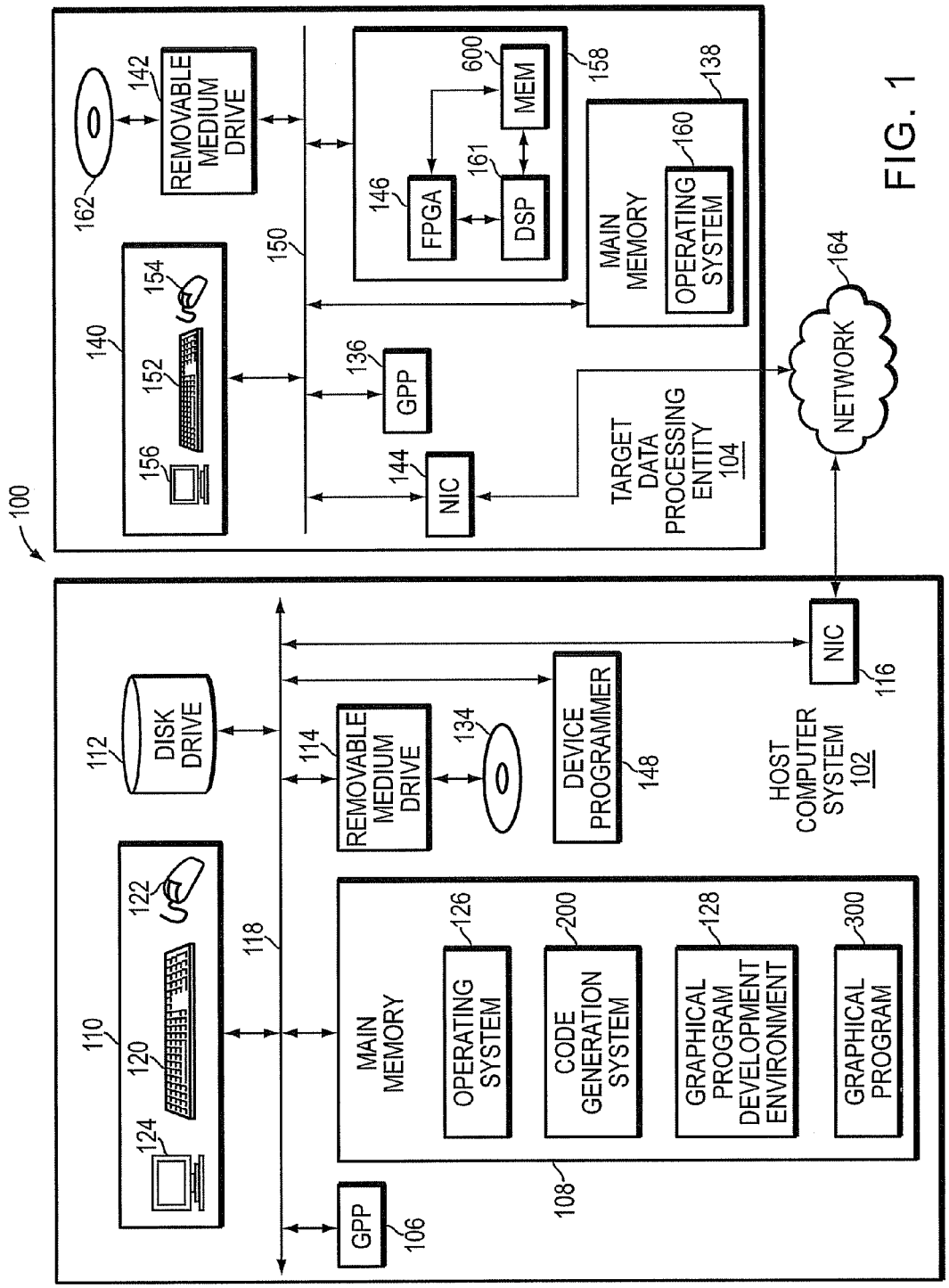
FIG. 1 is a schematic block diagram of a computer system suitable for use with the present invention.

Briefly, the invention relates to a system and method for configuring a target processing entity to execute a graphical program. The target processing entity has a general purpose processor and a programmable logic device coupled to the general purpose processor. In accordance with the illustrative embodiment, a user creates a graphical program, such as a model, block diagram or state chart, at a host computer system. The user designates a first part of the graphical program for execution by the target processing entity's general purpose processor, and a second part for execution by the programmable logic device. The host computer further includes a code generation system that generates a single target application build file from the graphical program. The code generation system includes a communication engine, an executable code generator, and a hardware description language (HDL) code generator. The single build file is organized into a plurality of sections: an initialization section, an executable code section that implements the first part of the graphical program, a communication section that supports communication between the general purpose processor and the programmable logic device of the target processing entity, a configuration set-up section for setting up the configuration of the programmable logic device, and a configuration section for configuring the programmable logic device to implement the second part of the graphical program. The target application build file may be downloaded to the target processing entity, which executes the build file, to implement the graphical program at the target processing entity.

Specifically, the executable code section is extracted and stored for execution by the general purpose processor of the target processing entity. The communication section is executed to establish a communication interface between the general purpose processor and the programmable logic device. The configuration set-up section is executed to prepare the programmable logic device for configuration. The configuration section is executed by a synthesis tool to configure the programmable logic device to implement the second part of the graphical program. The general purpose processor may then execute the executable code, and the programmable logic device may execute as configured such is that together they implement the graphical program at the target data processing entity.

In a further embodiment, the programmable logic device is located on an input/output subsystem, such as a plug-in board, that includes an on-board memory. The on-board memory is accessible by both the programmable logic device and the general purpose processor. The code generation system includes a memory mapping engine that evaluates the graphical model and automatically adds information to the communication section of the build file for organizing the on-board memory, in an automated manner, into regions, and assigning selected memory regions to various ones of the communication links between the first and second parts of the graphical program. The assigned memory regions are then used by general purpose processor and programmable logic device to share information.

In another embodiment, the target processing entity further includes an embedded processor, such as a Digital Signal Processor (DSP), which may be coupled to the onboard memory and the programmable logic device. The code generation system, moreover, further includes an assembly code generator for generating assembly code instructions, which represent yet another part of the graphical program, and are executable by the embedded processor. The assembly code instructions may be incorporated into the single build file along with the other code segments or fragments. The assembly code instructions may be stored at the on-board memory for execution by the embedded processor during implementation of the graphical program at the target data processing entity.

FIG. 1 is a schematic illustration of a computer system 100 for implementing and utilizing an embodiment of the invention. The computer system 100 includes a host computer system 102 coupled to a target data processing entity 104. The host computer system 102 may include a general purpose processor (GPP) 106, such as a central processing unit (CPU), a main memory 108, user input/output (I/O) 110, a disk drive 112, a removable medium drive 114, and a network interface card (NIC) 116 that are interconnected by a system bus 118. The user I/O 110 may include a keyboard 120, a mouse 122 and a display 124.

The main memory 108 stores a plurality of libraries or modules, such as an operating system 126 and one or more applications running on top of the operating system 126, including a graphical program development environment 128 for creating a graphical program 300, and a code generation system 200. The code generation system 200 may be configured as a toolbox or an add-on product to the graphical program development environment 128.

The removable medium drive 114 is configured to accept and read a computer readable medium 134, such as a CD, DVD, floppy disk, solid state drive, tape, flash memory, or other medium. The removable medium drive 114 may further be configured to write to the computer readable medium 134.

The host computer system 102 also may include a device programmer 148 for generating a programming file to configure, e.g., synthesize, a programmable logic device, such as a Field Programmable Gate Array (FPGA). The device programmer 148 may be located on a daughter board of the host computer system 102, among other places. The device programmer 148 may be a hardware synthesis tool, such as the ModelSim simulation and debug environment from Mentor Graphics Corp of Wilsonville, Oreg., or the Synplify family of synthesis tools from Synplicity, Inc. of Sunnyvale, Calif., among others.

Suitable computer systems for use as the host computer system 102 include personal computers (PCs), workstations, laptops and other portable computing devices, etc. Nonetheless, those skilled in the art will understand that the host computer system 102 is meant for illustrative purposes only and that the present invention may be used with other computer systems, processing systems or computational devices that may include additional or fewer components. For example, the host computer system 102 need not include a software development environment.

Suitable operating systems 126 include the Windows® series of operating systems from Microsoft Corp. of Redmond, Wash., the Linux operating system, the MAC OS® series of operating systems from Apple Inc. of Cupertino, Calif., and the UNIX® series of operating system, among others.

Suitable GPPs include single or multicore processors, such as the Core™, Pentium®, or Celeron® families of processors from Intel Corp. of Santa Clara, Calif., or the Phenom, AMD Athlon or AMD Opteron families of processors from Advanced Micro Devices, Inc. of Sunnyvale, Calif., among others.

The target data processing entity 104 may include a GPP 136, a main memory 138, user I/O 140, a removable medium drive 142, a network interface card (NIC) 144, and a programmable logic device 146 that are interconnected by a system bus 150. The user I/O 140 may include a keyboard 152, a mouse 154 and a display 156. In a preferred embodiment, the programmable logic device 146 may be disposed on a plug-in card 158, such as a Peripheral Component Interface (PCI) card, located in a slot of the target processing entity 104. The plug-in card 158 may also have an on-board memory 600 and an embedded processor 161, such as a Digital Signal Processor (DSP), coupled to each other and the programmable logic device 146. The plug-in card 158 may further include other components, such as analog-to-digital (A/D) and digital-to-analog (D/A) converters, signal conditioning logic, etc., to provide and receive input/output (I/O) signals to and from one or more external devices (not shown), such as controllers, transducers, cameras, etc.

The main memory 138 of the target data processing entity 104 stores a plurality of libraries or modules, such as an operating system 160, which may be a real-time kernel. A suitable real-time kernel is the xPC Target real-time kernel from The MathWorks, Inc. However, the target data processing entity 104 may also run in a stand-alone mode where the target data processing entity 104 bootstraps and runs the real time kernel and any real time application directly without the intervention of a host computer. Such a bootstrap process may take place using data from a removable storage medium, such as a floppy disk, CD, DVD, flash disk, or from fixed medium, such as a hard disk drive. This bootstrap may take place using only facilities provided by the hardware vendor (such as the hardware BIOS) or by means of an intermediate software based operating system or kernel, such as DOS.

The removable medium drive 142 is configured to accept and read a computer readable medium 162, such as a CD, DVD, floppy disk, solid state drive, tape, flash memory or other medium. The removable medium drive 142 may further be configured is to write to the computer readable medium 162.

Suitable programmable logic devices include Field Programmable Gate Arrays (FPGAs), Application Specific Integrated Circuits (ASICs), Complex Programmable Logic Devices (CPLDs), etc., such as those commercially available from Xilinx, Inc. and Altera Corp. both of San Jose, Calif. Suitable embedded processors include the C6000 series of Digital Signal Processors (DSPs) from Texas Instruments Inc. of Dallas, Tex.

It should be understood that the plug-in card 158 may be compatible with other bus technology besides PCI, such as ISA, PC/104, PC/104+, CompactPCI, PCI-X, PCI Express, etc.

The host computer system 102 may be in communicating relationship with the target data processing entity 104 through a network 164. The host computer system 102 and the target data processing entity 104 may utilize the Transmission Control Protocol/Internet Protocol (TCP/IP) protocols to communicate with each other. Nonetheless, those skilled in the art will understand that other communication mechanisms and techniques may be used, such as a serial link (RS-232), wireless link, etc.

Suitable computer systems for use as the target processing entity 104 include PC, workstations, laptops and other portable computing devices, systems in other form factors, such as single board computers, PC/104 systems, CompactPCI architectures, etc. The target processing entity 104 is meant for illustrative purposes only and that the present invention may be used with other computer systems, processing systems or computational devices that may include additional or fewer components.

As indicated above, a user or developer, such as an engineer, scientist, programmer, etc., may utilize the keyboard 116, mouse 118 and computer display 120 of the user I/O 106 at the host computer system 102 to operate the graphical program development environment 128 and create a graphical program 300.

The graphical program may be time-based model, such as those created with the Simulink® technical computing environment from a state-based graphical model, such as those created with the Stateflow® modeling environment, an entity-based graphical model, such as those created with the SimEvents® modeling environment from The MathWorks, Inc., or a data flow diagram, such as those created with the LabVIEW programming environment from National Instruments Corp. of Austin, Tex. Tools for creating other graphical programs suitable for use with the present invention include the Visual Engineering Environment (VEE) from Agilent Technologies, Inc. of Santa Clara, Calif., and the Khoros development system from AccuSoft Corp. of Northborough, Mass., among others.

Figure 2:
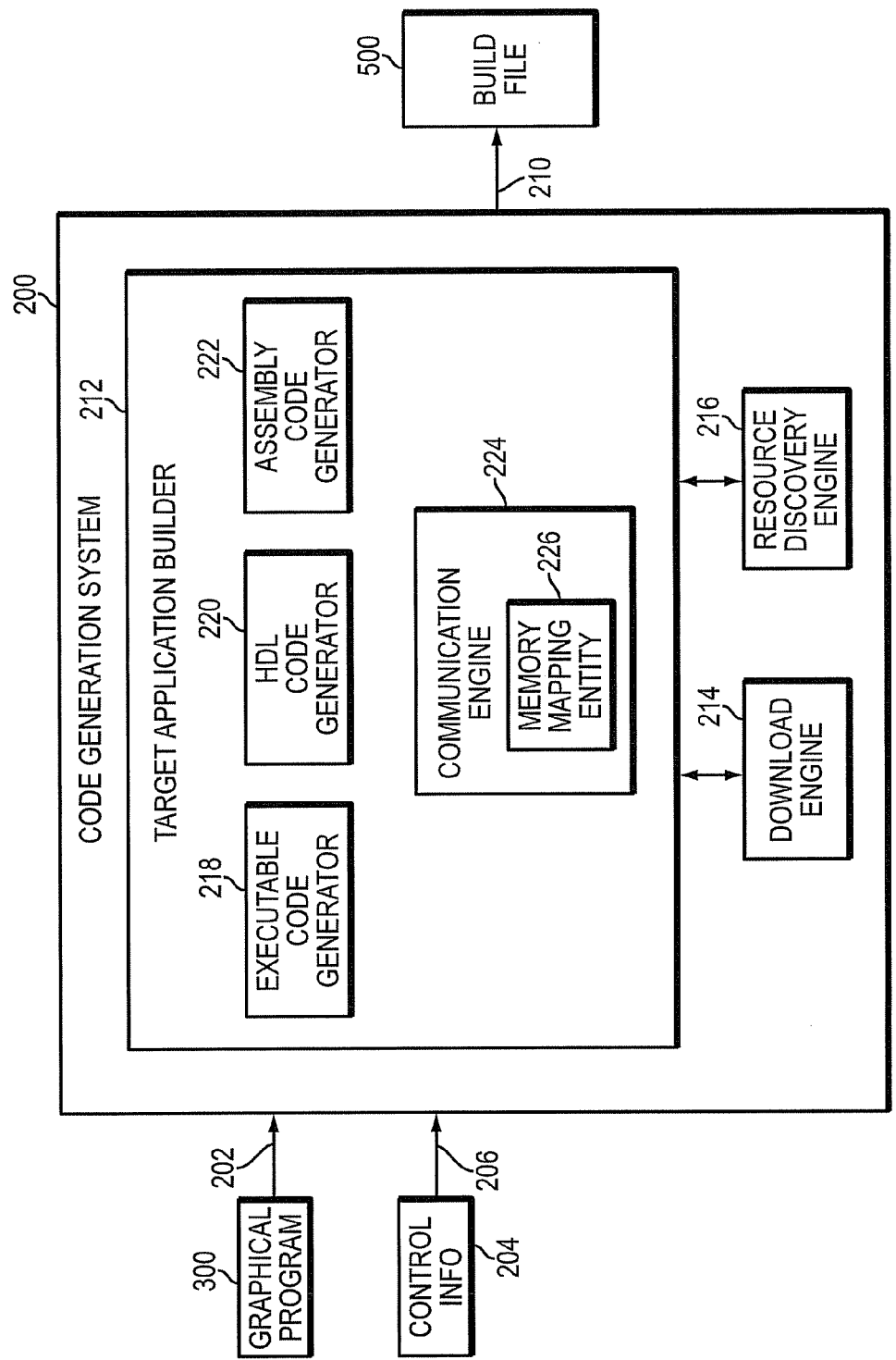
FIG. 2 is a schematic block diagram of a code generation system in accordance with a preferred embodiment of the present invention.

FIG. 2 is a schematic block diagram of the code generation system 200. The code generation system 200 may receive the graphical program 300, as indicated by arrow 202. The code generation system 200 may also receive control information 204 from the user or developer, as indicated by arrow 206. As described herein, the code generation system 200 may be configured to produce a single build target application or installation file 500 for implementing the graphical program 300 on multiple, dissimilar processing entities, such as the GPP 136, the embedded processor 161, and the programmable logic device 146 of the target processing entity 104, as indicated by arrow 210.

The code generation system 200 may include a plurality of components or modules. Specifically, the code generation system 200 may include a target application builder 212, a download engine 214 and a resource discovery engine 216. The target application builder 212, moreover, may include an executable code generator 218, a hardware description language (HDL) code generator 220, an assembly code generator 222, and a communication engine 224. The communication engine 224 may include a memory mapping entity 226.

In an embodiment, the device programmer 148 may be included as a component of the target application builder 212.

It will be understood by those skilled in the art that the target application builder 212, the download engine 214, the resource discovery engine 216, the executable code generator 218, the HDL code generator 220, the assembly code generator 222, the communication engine 224 and the memory mapping entity 226 as well as device programmer 148 may each comprise registers and combinational logic configured and arranged to is produce sequential logic circuits. In the illustrated embodiment, the target application builder 212, the download engine 214, the resource discovery engine 216, the executable code generator 218, the HDL code generator 220, the assembly code generator 222, the communication engine 224 and the memory mapping entity 226 as well as device programmer 148 are preferably software modules or libraries containing program instructions pertaining to the methods described herein, that may be stored on computer readable media, such as computer readable medium 134, and executable by one or more processing elements, such as GPP 106. Other computer readable media may also be used to store and execute these program instructions. In an alternative embodiment, various combinations of software and hardware, including firmware, may be utilized to implement the present invention.

It should be understood that the target application builder 212, in further alternative embodiments, may generate SystemC code or code in other languages.

Figure 3:
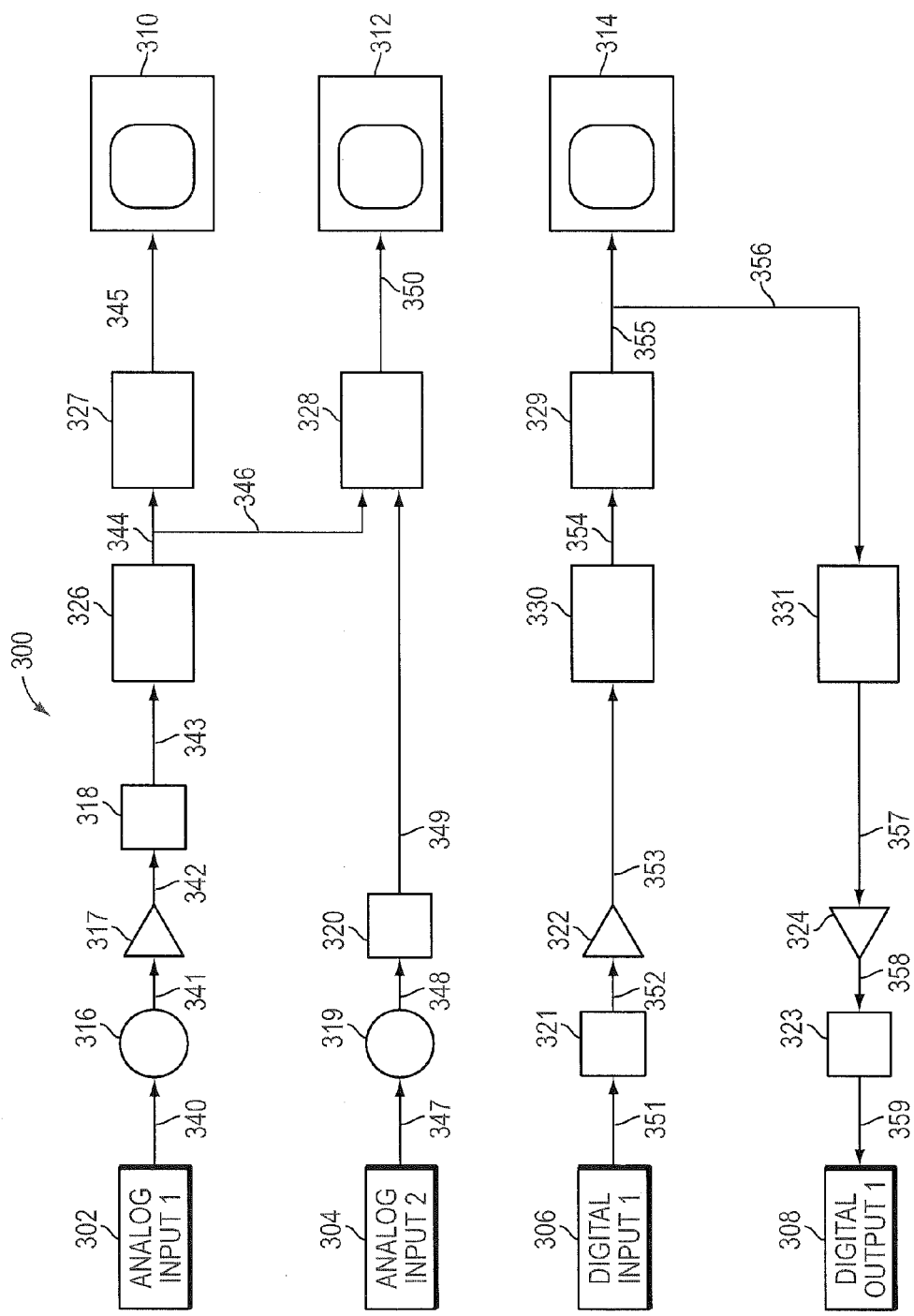
FIGS. 3 and 7 are illustrations of exemplary graphical programs.

FIG. 3 is a schematic illustration of an exemplary graphical program, such as graphical program 300. As shown, the graphical program 300 includes a plurality of blocks or nodes interconnected by lines. Each block or node may represent an operation, a function, a state, a subsystem, which itself may have a plurality of interconnected blocks or nodes, etc. Exemplary operations or functions include mathematical operations, Boolean operations, input/output (I/O) functions, filters, model verification functions, etc. Each line between blocks may represent a mathematical relationship among the signals defined by the graphical program 300, an event, a signal, the flow of data and/or control, etc.

Specifically, the graphical program 300 has first and second analog input blocks 302 and 304, a digital input block 306, and a digital output block 308. The graphical program 300 also has a first display block 310, a second display block 312, and a third display block 314. Display blocks 310-314 display the value of signals or data received by those blocks on a display screen. The graphical program 300 also has a first set of function blocks 316-324, a second set of function blocks 326-329, and a third set of functions blocks 330-331. The graphical program also has lines 340-359 interconnecting the is blocks.

Graphical program 300 is meant for illustrative purposes only. Those skilled in the art will recognize that other, e.g., simpler, more complex, or other graphical programs having different types or arrangements of blocks, etc, may be created by the user or developer. For example, the graphical program 300 may include one or more blocks that each reference another model or graphical program, such as the Model Reference block from The MathWorks, Inc.

Figure 4A:
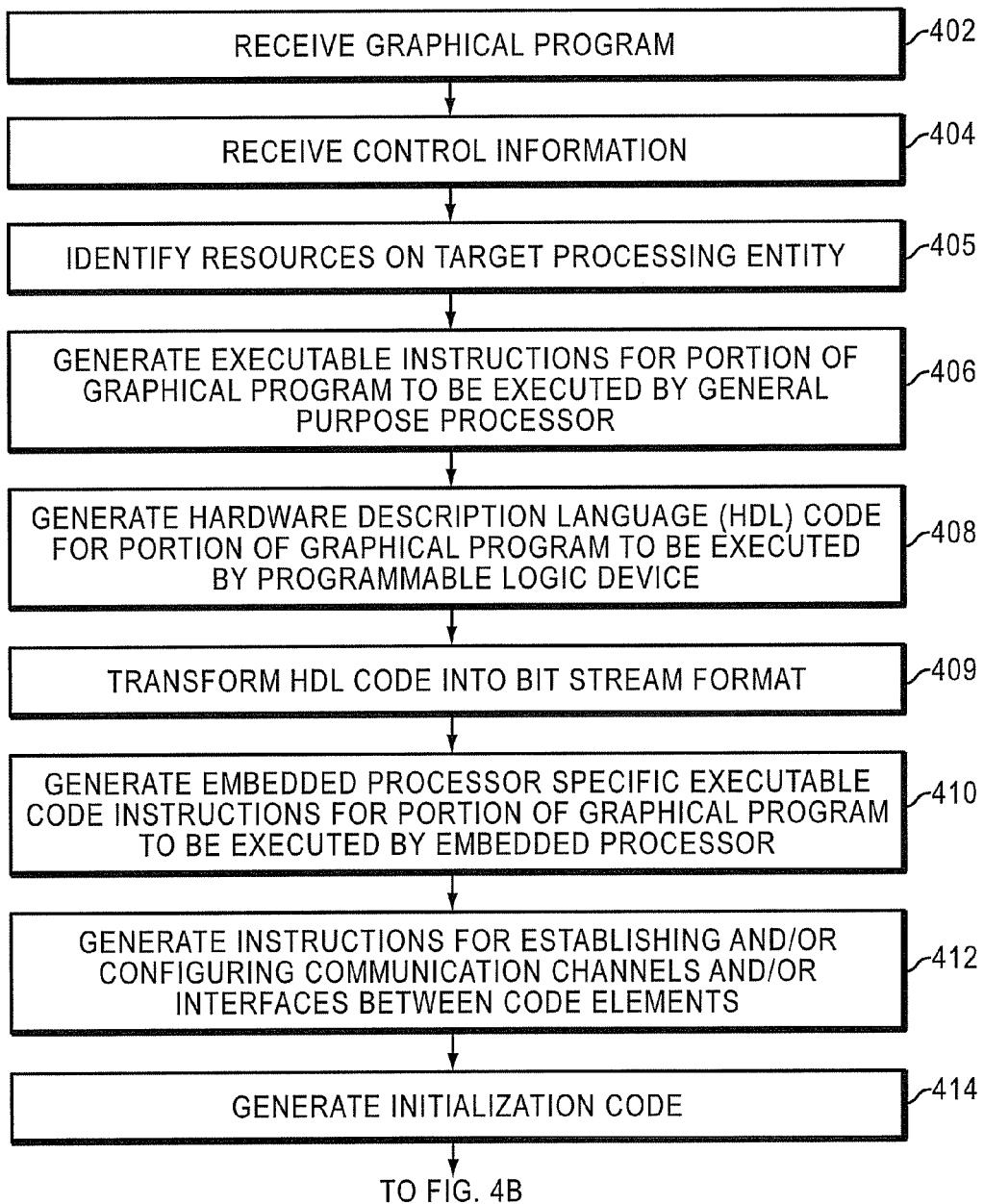
FIGS. 4A and 4B are a flow diagram of a method in accordance with a preferred embodiment of the present invention.
Figure 4B:
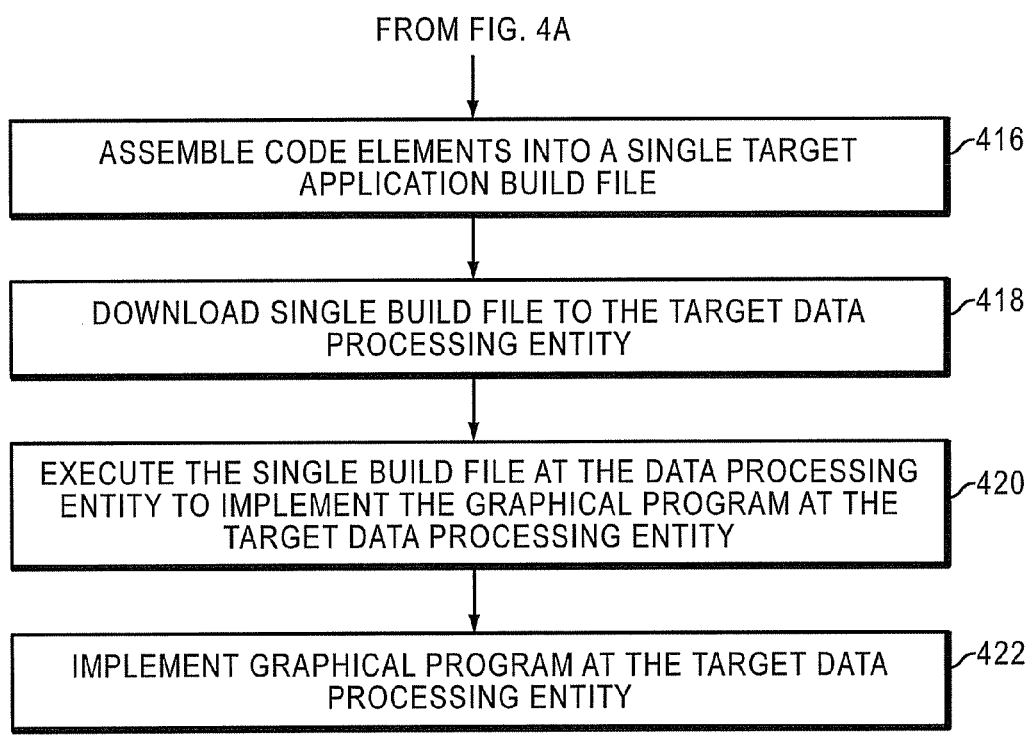

FIGS. 4A and 4B are a flow diagram of a method in accordance with a preferred embodiment. The target application builder 212 of the code generation system 200 receives a graphical program, such as program 300, as indicated at block 402. The graphical program 300 may have been created by a user operating the host computer system 102, and/or it may be stored in main memory 108, on disk drive 112, or medium 134, among other places. The target application builder 212 also receives the control information 204, as indicated at block 404. The control information 204 may include information indicating which blocks of the graphical program 300 are to be executed by corresponding processing elements at the target processing entity 104. For example, suppose that the user wants to have blocks 302-308 and 316-324 of the graphical program 300 executed by the programmable logic device 146, blocks 310-314 and 326-329 executed by the GPP 136, and blocks 330-331 executed by the embedded processor 161. This information may be contained in the control information 204.

It should be understood that the control information 204 may be incorporated in the graphical program 300.

In an alternative embodiment, a first subsystem block, such as a Simulink Model Reference block, may be selected for implementation by one processing element, e.g., the programmable logic device 146, and a second subsystem block may be selected for implementation by another processing element, e.g., GPP 136. The subsystem blocks may then represent the first and second portions of the executable code, respectively. Code may be generated separately for the first and second portions to be executed on the GPP 146 and the programmable logic device 146.

As will be appreciated by those skilled in the art, the user may make this designation and provide this information to the code generation system 200 in different ways. For example, the user may place a first group of blocks into a first subsystem, and a second group of blocks into a second subsystem. The user may also set a property or parameter of the first subsystem indicating that it is to be executed by the GPP 136. The user may set a property or parameter of the second subsystem indicating that it is to be executed by the programmable logic device 146. In another embodiment, the user may call-up a properties or parameters page (not shown) for each block, e.g., by right clicking the block with the mouse 122. The properties or parameters page may include an entry or field, which is settable by the user, specifying or identifying the particular processing element on which the respective block is to be executed.

In yet another embodiment, the user may draw a border around a group of blocks to be executed by a given processing element using the keyboard 120 and/or mouse 122. The user may then specify that the blocks contained within this border are to be executed by a particular processing element, e.g., GPP 136. The selection may be made by right clicking the border with the mouse 122, which may cause a properties or parameters page (not shown) to be displayed on screen 124. The user may operate this page to select or specify the desired processing element.

The determination of which processing element to use may be facilitated by the resource discovery engine 216. Specifically, the resource discovery engine 216 may be configured to search for and identify the particular processing elements and other resources located on the target processing entity 104, as indicated at block 405. For example, the target processing entity 104 may include a device manager that includes or has access to information concerning the processing elements disposed on the target processing entity 104, such as through an auto-detection feature. The resource discovery engine 216 may be configured to communicate, e.g., query, the device manager via network 164, and obtain the identity and/or type of processing elements at the target processing entity 104, i.e., GPP 136, programmable logic device 146, and embedded processor 161. The resource discovery engine 216 may be further configured to obtain information concerning the memory resources and communication resources, such as information regarding busses, DMA controllers, NIC cards, etc. This information may be displayed to the user, e.g., on screen 124, to facilitate the assignment of blocks of the graphical program 300 to processing elements at the target processing entity 104.

The executable code generator 218 may generate a set of executable code instructions, such as compiled and linked C or C++ code, corresponding to the blocks designated for execution by the GPP 136, as indicated at block 406. The HDL code generator 220 may generate HDL code, such as VHDL or Verilog code, corresponding to the blocks designated for execution by the programmable logic device 146, as indicated at block 408. The device programmer 148 may convert the HDL code into a bit stream suitable for configuring the programmable logic device 146, as indicated at block 409.

The device programmer 148 may use information regarding the particular programmable logic device 146 at the target data processing entity 104, such as its type or model number, to generate a bitstream file for that particular programmable logic device 146. For example, the resource discovery engine 216 may determine that the programmable logic device is a particular model of FPGA from Xilinx, Inc. The device programmer 148, in turn, may obtain this information and generate a bitstream compatible with this particular FPGA.

The assembly code generator 222 may generate embedded processor specific executable code, such as compiled and linked C or C++ code that is specially generated for execution on the particular embedded processor, such the C6000 DSP from Texas Instruments Inc. of Dallas, Tex., for the blocks designated for execution by the embedded processor 161, as indicated at block 410. That is, the target application builder 212 and the device programmer 148 are configured to utilize information obtained by the resource discovery engine 216 to generate code and programming files that target the particular hardware, e.g., embedded processor and programmable logic device, at the target data processing entity 104.

The communication engine 224 examines the interconnection of blocks selected for execution by different processing entities, and generates one or more communication interfaces or primitives to support communication between the respective blocks, as indicated at block 412. With regard to the graphical program 300, for example, the communication engine 224 determines that line 343 extends between block 318 to be executed by the programmable logic device 146 and block 326 to be executed by the GPP 136. Based on the parameters of block 318 and the properties of its input, e.g., as represented by line 342, the communication engine 224 determines the properties of the signal or mathematical relationship represented by line 343.

The communication engine 224 may select an appropriate communication channel and/or interface to support the signal or mathematical relationship represented by line 343, and may generate executable instructions for establishing and/or configuring that communication channel and/or interface. Specifically, the communication engine 224 is configured to receive information from the resource discovery engine 216 regarding the particular communication and memory resources at the target data processing entity 104. This information may include the bus architecture, e.g., PCI, the size and type of onboard memory 600, the number of DMA controllers, the presence of a network interface card or wireless adapter, etc.

The properties of a signal or mathematical relationship may include its data type or format, which refers to its precision, such as single precision, double precision, quadruple precision, etc., whether it is signed or unsigned, and whether it is fixed point, floating point, or integer. The properties of a signal may further include its dimensionality, such as one-dimensional (1-D) or two-dimensional (2-D), its word size, e.g., 8-bit, 16-bit, 32-bit, etc, and its length, such as vector length, among other properties. Additional properties of a signal may include information regarding programming language specific data types or structures, such as the struct data type of the C programming language, which may be used to group variables together with a common name, as well as information regarding padding, alignment, and hardware properties, such as byte accessible, read/write only, and cache size.

An example of a communication channel or interface that may be available to support the signal or mathematical relationship is a Direct Memory Access (DMA) transfer to the main memory 138 of the target processing entity 104. The communication engine 224 may assign an area of main memory 138, e.g., an address space or range of addresses, for the DMA transfer supporting the signal or mathematical relationship represented by line 343. The information for configuring the plug-in card 158 to initiate a DMA transfer of data represented by signal or mathematical relationship represented by line 343, and for storing that data at the designated area of main memory 138 may be generated by the communication engine 224. The communication engine 224 also may generates information, such as read instructions, for execution by the GPP 136 to read this area of main memory 138 during the execution of the operation or function represented by block 326.

Another example of a communication channel or interface available to support a signal or mathematical relationship may employ an area or region of the on-board memory 600 of the plug-in card 158 shared by multiple processing elements, as described in more detail herein. Yet another example of an appropriate communication channel or interface is an interrupt signal from the plug-in board 158 to the GPP 136. Other communication channels may not be based on an interface between a plug-in board and the GPP. For example, a communication channel or interface may include an Ethernet or other networking communication protocol, such as wireless networking, a serial communication link, etc. That is, the programmable logic device 146 may be coupled to the target data processing entity 104 (and thus the GPP 136) through an Ethernet link, a wireless link, a serial link, etc.

Upon evaluating the graphical program 300, the communication engine 224 may determine that blocks 318, 320, 322, 330, 329, and 331 are send blocks, as they send data or signals between processing elements, and that blocks 326, 328, 330, 329, 331, and 324 are receive blocks, as they receive data or signals between processing elements. As shown, a given block may be both a send and a receive block.

The target application builder 212 may also generate initialization code, as indicated at block 414. The target application builder 212 assembles the code elements or fragments generated by the executable code generator 218, the HDL code generator 220, the device programmer 148, the assembly code generator 222, and the communication engine 224 into a single target application build file 500, or more simply build file, as indicated at block 416 (FIG. 4B).

Figure 5:
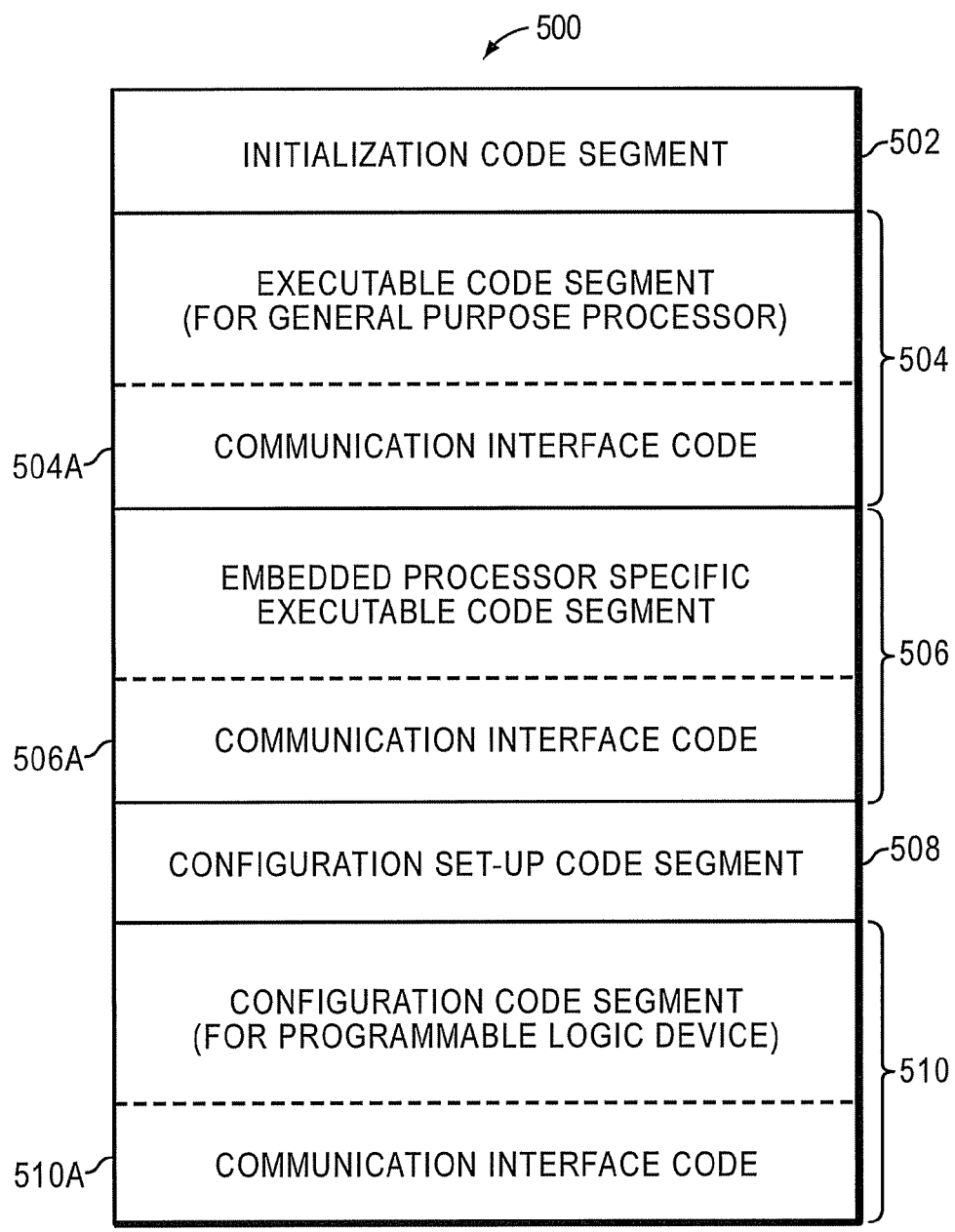
FIG. 5 is a schematic illustration of a build file.

FIG. 5 is a schematic illustration of a form of the single build file 500. The build file 500 may be organized into a plurality of sections. Specifically, the build file 500 may include an initialization section 502, an executable code section 504, e.g., compiled C or C++ code, that implements that portion of the graphical program to be executed by the GPP 136, an embedded processor specific executable code section 506, e.g., code compiled for the particular embedded processor, that implements that portion of the graphical program to be executed by the embedded processor 161, a configuration set-up section 508 for setting up the configuration of the programmable logic device 146, and a configuration code section 510, e.g., a bitstream, for configuring the programmable logic device to implement that portion of the graphical program to be executed by the programmable logic device 146. The build file 500 may also include one or more communication code sections that provide the communication interfaces or primitives to support intercommunication among the GPP 136, the embedded processor 161 and the programmable logic device 146 of the target processing entity 104.

The communication code segment may be distributed among and included as a sub-segment within one or more of the executable code section 504, the embedded processor specific executable code section 506, and the configuration code section 510. For example, the executable code segment 504 may include a communication interface code sub-segment 504a that is part of the executable code segment 504. Similarly, the assembly code segment 506 and the configuration code segment 510 may each include a communication interface code sub-segment 506*a* and 510*a*, respectively.

Alternatively, the one or more communications sections may be a separate section or sections within the build file 500.

The communicate code segment(s) may contain information for mapping the signals or mathematical relationships of the graphical program to the communication channels or interfaces of the target data processing entity 104, such as information for carving up memory regions, reading and/or writing data to those memory regions, implementing mutual exclusion locks or semaphores, blocking data that is not ready, marking the status is of data, such as ready, new, stale, read, etc.

The initialization section 502 may include information indicating where each of the other sections of the file is located, such as offsets. The initialization section 502 may also include one or more initialization or start sequences as well as code to be executed before regular, e.g., periodic, execution begins, such as setting shared variables to predefined values. The initialization section 502 may further include code for performing memory allocation for the GPP 136, the embedded processor 161 and/or the programmable logic device 146.

The host computer system 102 may download the single build file 500 to the target processing entity 104, as indicated at block 418. The host computer system 102 may include an Explorer application (not shown) that is configured to include the target data processing entity 104. From the Explorer application, the user or developer may use mouse 122 to drag the single target application build file 500 from the host computer system 102, and drop it onto the target data processing entity 104. This action may cause the download engine 214 to download the build file 500 to the target data processing entity 104.

The target processing entity 104 may store the single build file 500, at least initially, at main memory 138. It may also be stored on a hard disk drive or other non-volatile memory or on the target processing entity before being loaded into main memory.

The target processing entity 104 may execute the build file 500 to implement the graphical program 300 at the target processing entity 104, as indicated at block 420. More specifically, the executable code section 504 may be extracted and stored at main memory 138 for execution by GPP 136. Code executable by the GPP 136 to initialize or set-up one or more communication interfaces and/or primitives among the GPP 136, the embedded processor 161, and the programmable logic device 146 may be included in the initialization code segment 502. The embedded processor specific executable code section 506 may be extracted and stored at on-board memory 160 for execution by the embedded processor 161.

The configuration set-up section 508 is executed to prepare the programmable logic device 146 for configuration. The configuration section 510 may be executed by the GPP 136 to set-up the programmable logic device 146 for configuration. This may include code for locating the plug-in board 158 containing the programmable logic device 146, mapping the on-board memory 600 to the memory space of the GPP 136, executing bus specific commands to access the on-board memory 600 and/or registers on the plugin board 158 or on the programmable logic device 146. This process may enable the download of the executable code 510, e.g., the bitstream, to the programmable logic device 146, thereby configuring it.

For a PCI device, such as the plug-in card 158, the execution of the one or more communication sections involves configuring the plug-in card 158, such as, setting up the communication channel between the GPP 136 and the plug-in card 158, and then performing the required device-specific initialization. Access to the plug-in card 158 may be gained by mapping its registers, i.e., its memory space, into the kernel's address space, or by reading and writing in the device's I/O space. Execution of one or more of the communication sub-sections may further include programming one or more DMA controllers, etc.

The GPP 136, embedded processor 161 and programmable logic device 146 may run such that together they implement the graphical program 300 at the target data processing entity 104, as indicated at block 422. That is, the GPP 136 executes the executable instructions stored at the main memory 138. The embedded processor 161 executes the assembly code stored at the on-board memory 600. The programmable logic device 146 executes as configured by the device programmer 148.

It should be understood that the single build file 500 can be stored on removable medium 162, e.g., by the host computer system 102, and read by the removable medium drive 142 of the target data processing entity 104. In a further embodiment, the single build file 500 can be downloaded by the target data processing entity 104 from an Internet website, such as a File Transfer Protocol (FTP) website.

In an embodiment, other information may be exchanged among the host computer system 102 and the target data processing entity 104. For example, control information for controlling program 300, such as starting and stopping the program, changing sample and stop times, and obtaining information about the performance of the target data processing entity 104 may be exchanged. Data from the target data processing entity 104 may be uploaded to the host computer system for analysis or plotting. Parameter values may be downloaded to the target data processing entity 104 between runs or during a run.

Mapping Memory Regions

As described above, the passing of data and/or signals between the GPP 136 and the programmable logic device 146 and/or the embedded processor 161 may be achieved by designating one or more regions of the on-board memory 600 on the plug-in card 158 as shared memory. In a further embodiment, one or more of the communication sections includes instructions for carving up the on-board memory 600 into a plurality of separate, non-overlapping regions for sharing data and/or signals between the GPP 136 and the programmable logic device 146 and/or the embedded processor 161. More specifically, each signal, mathematical relationship, or data stream represented by a line in the graphical model 300 that extends between a block being implemented by the GPP 136 and a block being implemented by the programmable logic device 146 and/or the embedded processor 161, such as lines 343, 349, 354 and 356, is assigned to one of the regions established at the on-board memory 600. The communication engine 224 may examine the properties of the data and/or signals being passed to select an appropriate size for each of the memory regions. The communication engine 224 may also receive information from the user, such as an indication that one or more of the signals or mathematical relationships is synchronous or asynchronous. This information may be specified by the user through a graphical user interface.

For example, suppose a signal or mathematical relationship of the graphical program 300 corresponds to a C-like data struct having four members: a 4-byte unsigned long integer, a 2-byte unsigned short integer, a 2-byte pad, and an 8-byte double word. Suppose further that the properties of this signal or mathematical relationship are: asynchronous and atomic read/write. In response, one or more of the communication code subsections may include code for establishing a 16-byte shared memory region for this data struct. The communication code may also include code for establishing mutual exclusions, blocking algorithms, etc.

Figure 6:
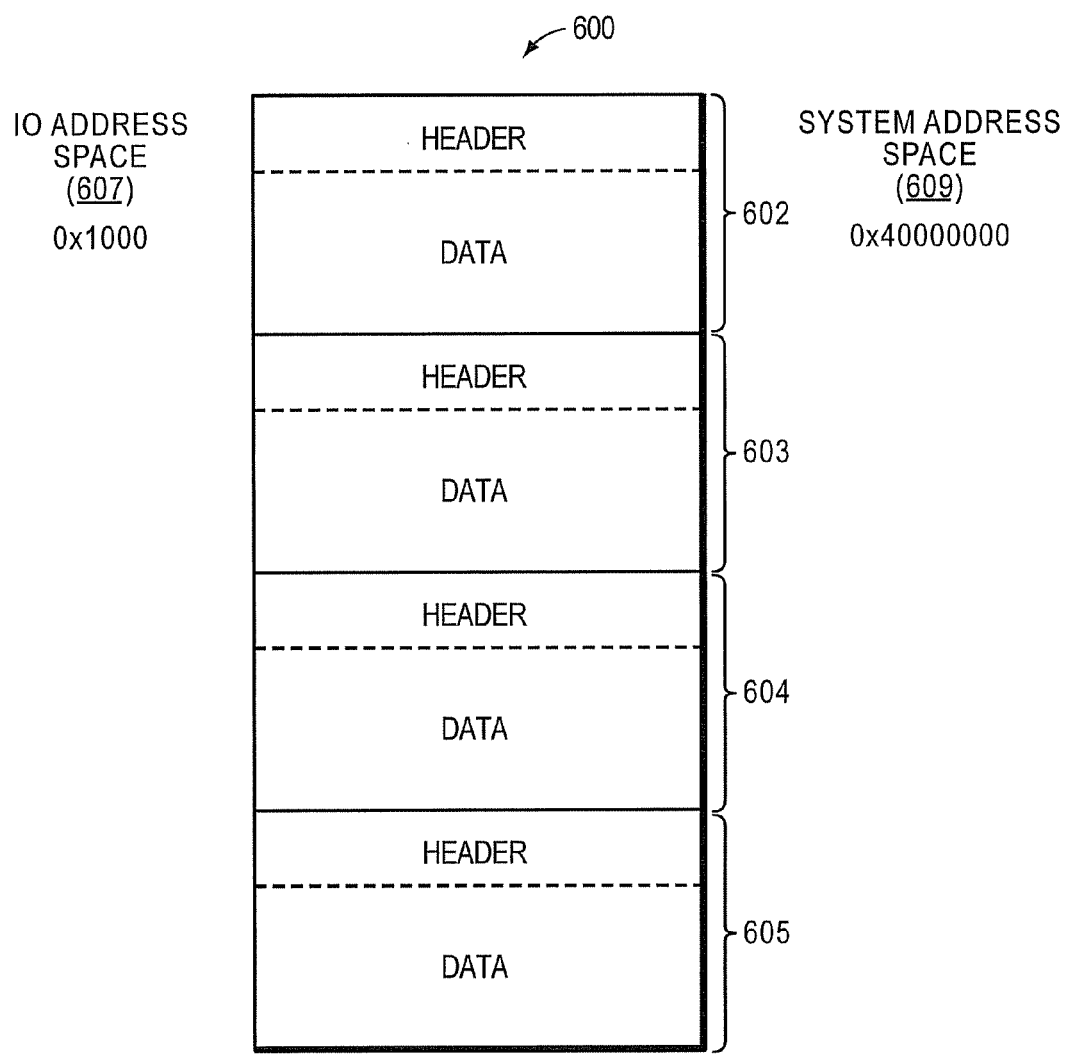
FIG. 6 is a schematic illustration of a mapping of an on-board memory.

FIG. 6 is a schematic illustration of the on-board memory 600 organized into four regions 602-605. Each region 602-605 may include a header area and a data area. The header areas may store system level information, such as the number of memory regions, total memory used, etc. For each memory region, the header area may include an address to where the data has been mapped, the size of the data region and control information. The control information may include flags indicating whether the respective data (or portions thereof) is new, old, stale, read, blocked, etc. The control information may also implement mutual exclusion, semaphores, timing restrictions, accessibility restrictions, such as read/write only, etc.

The data areas may store the data to be shared between the GPP 136 and the programmable logic device 146 and/or the embedded processor 161. For example, the first region 602 may be used to share data represented by the signal or mathematical relationship represented by line 343 from the programmable logic device 146 to the GPP 136. The second region 603 may be used to share data represented by the signal or mathematical relationship represented by line 349 also from the programmable logic device 146 to the GPP 136. The third region 604 may be used to share data represented by the signal or mathematical relationship represented by line 354 from the embedded processor 161 to the GPP 136. The fourth region 605 may be used to share data represented by the signal or mathematical relationship represented by line 356 from the GPP 136 to the embedded processor 161.

The programmable logic device 146 and/or the embedded processor 161 may access each region 602-605 of the on-board memory 600 through a first, TO, address space, while the GPP accesses each region through a second, system, address space 6. Furthermore, the communication engine 224 in addition to establishing the regions 602-605, among other things, may also provide information concerning the translation of memory is addresses between the IO address space and the system address space. For example, the communication engine 224 may create one or more address translation (or lookup) tables. The communication engine 224 may specify the corresponding IO address space range 607 and the system address space range 609 for each memory regions 602-605.

More specifically, the communication engine 224 may receive the addressing schemes used the GPP 136 and the programmable logic device 146 and/or the embedded processor 161 from the resource discovery engine 216. The communication engine 224 may then utilize this received information to specify the corresponding address ranges of the different regions 602-605 of the on-board memory 600 in terms that match the system address scheme of the GPP 136 and the IO address scheme of the programmable logic device 146 and/or the embedded processor 161.

In a preferred embodiment, one of the processing elements, e.g., the GPP 136, is selected as a master, and the other processing element, e.g., the programmable logic device 146 or embedded processor 161, is selected as a slave. The build file 500 includes code executable by the master to write a description of the mapping of regions 602-605 to signals of the model at runtime. This mapping may be written to a prearranged location of memory 138, and read by the slave.

For example, the pre-arranged shared data may include multiple variables with disparate data types. Suppose a user decides to share twenty variables, ten representing 32-bit quantities and ten representing 16-bit quantities. Suppose also that, in the graphical program created by the user, the 32-bit quantities are updated every sample time, and the 16-bit quantities are updated every fifth sample time. In response, the communication engine 204 may choose to divide the memory into two regions: a first region having the ten 32-bit quantities, i.e., 40-bytes; and a second region having the ten 16-bit quantities, i.e., 20-bytes. Suppose further that each region has a 4-byte header for holding synchronization variables. If the memory region designated as shared is at hexadecimal 0x10000000 (as determined at run-time), then the first region (32-bit quantities) may have its data at 0x10000004 continuing to 0x1000002B. Aligning memory to 4-byte regions may be most efficient. Accordingly, the second region (16-bit quantities) may have is its data at 0x10000030 (0x1000002C aligned to 4-bytes is unchanged, plus 4-bytes for the header).

The particular memory regions, including their start address and size, may be determined when the target application builder 212 creates the build file 500 or when the target data processing entity executes the build file 500.

A processing element at the target data processing entity 104, such as the GPP 136, after writing data to a shared region, e.g., fourth region 605, may use a semaphore, interrupt, or signaling mechanism to notify the other processing element, e.g., the embedded processor 161, that data has been written to the shared region 605 and is ready to be read.

A polling mechanism may be used to determine if new data is available. The GPP 136 may write the data to the shared region, but the programmable logic device 146 may not be ready to use it immediately. When the programmable logic device 146 is ready, it may interrogate the header section of the data region to determine, e.g., based on the value or setting of a flag, whether new data is available and, if not, it may periodically "poll" the flag to wait for new data. Once new data is available, the programmable logic device 146 may then operate on the data.

It should be understood that one or more aspects of the proposed mapping or organization of the on-board memory 600 may be presented to the user for acceptance or modification. That is, the user may be permitted to make modifications to one or more aspects of the mapping proposed by the communication engine 224.

Figure 8A:
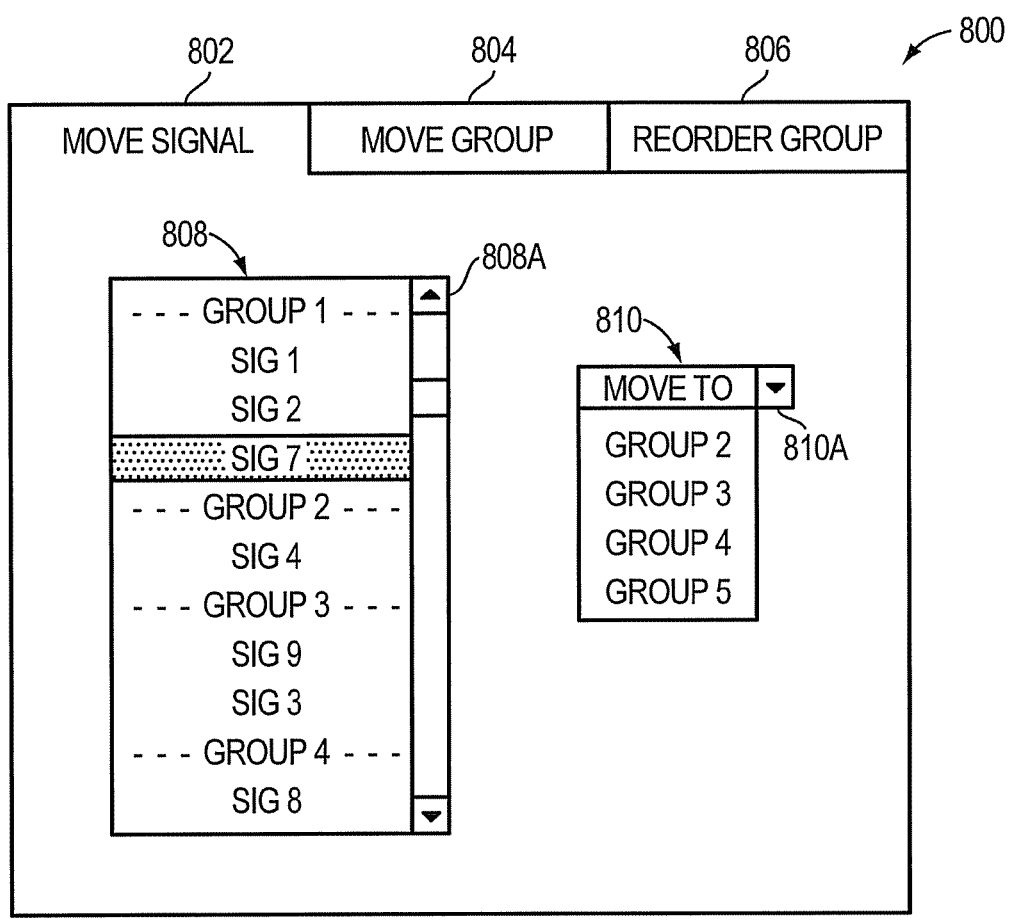
FIGS. 8A-C illustrate an exemplary graphical user interface.
Figure 8B:
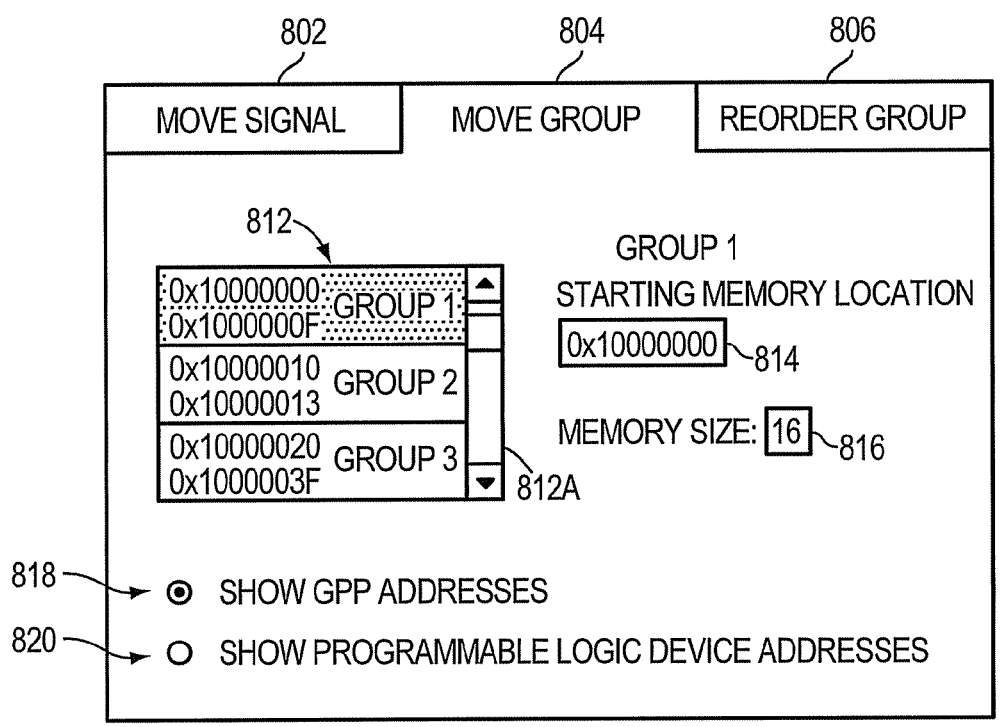
Figure 8C:
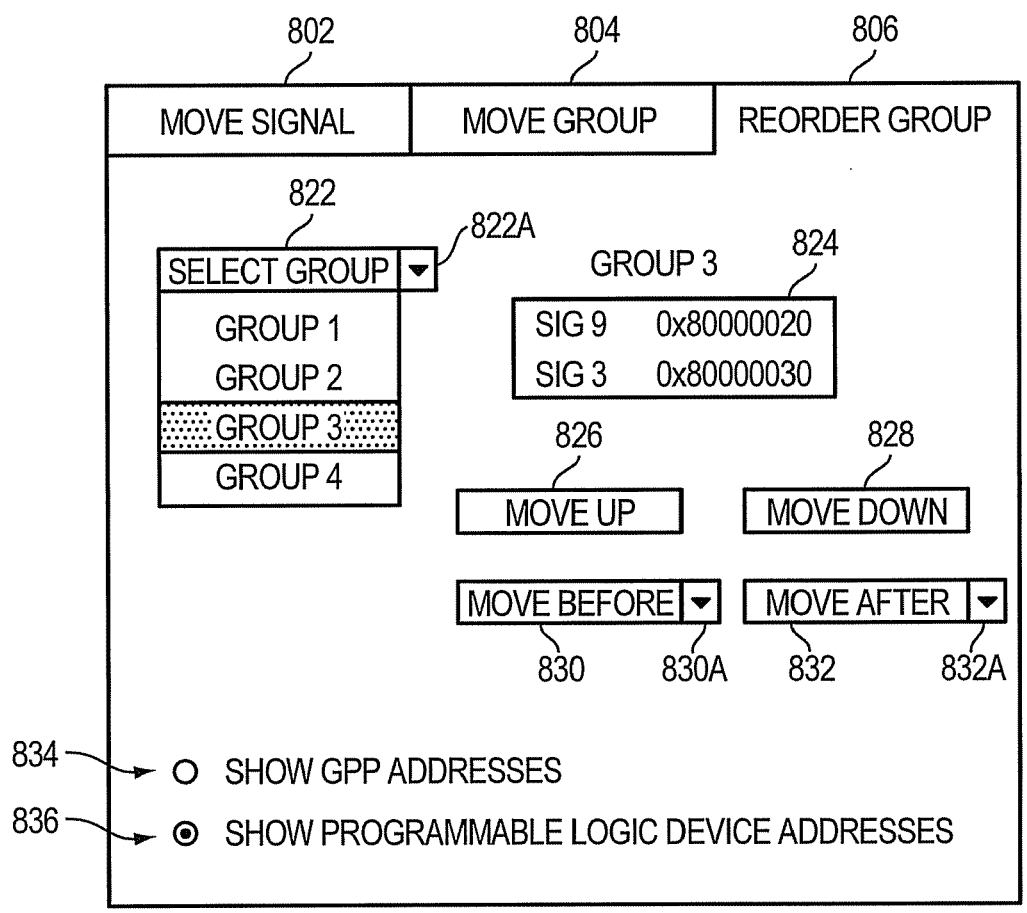

FIGS. 8A-C illustrate an embodiment of a Graphical User Interface (GUI) 800 through which a user may modify memory mapping aspects originally determined and proposed by the communication engine 224. As shown, GUI 800 has three tabs each associated with a respective panel of the GUI 800. In the illustrated embodiment, the GUI 800 has a Move Signal panel 802, a Move Group panel 804, and a Reorder Group panel 806.

FIG. 8A illustrates an embodiment of the Move Signal panel 802 of the GUI 800. The Move Signal panel 802 may include a signal box 808 and a move box 810. As described herein, the Move Signal panel 802 allows a user to move a given signal from a first group to a second group. The signal box 808, which may include a vertical scroll bar 808a, presents a list of the signals, such as sig1, sig2, sig3, etc., organized by group, such as Group 1, Group 2, Group 3, etc., as determined by the communication engine 224. That is, the communication engine 224 may determine which signals are to be grouped together, and which region of the on-board memory 600 each group is to be mapped. In other words, each group of signals may be mapped to a specific region of the on-board memory 600. The user, however, may change the organization of signals. More specifically, the user may select a particular signal, e.g., sig7, from the signal box 808 using the mouse, which may cause the selected signal to be highlighted. After selecting the signal that is to be moved to a new group, the user then may select, e.g., using the mouse, the new group, such as Group 2, from the move box 810, which may have a drop down arrow 810*a*. In this way, the user may override or change the grouping of one or more signals as originally determined and proposed by the communication engine 224.

A user may move a signal having a specific rate to a group with a lower access rate where the user knows that the signal is not critical.

FIG. 8B illustrates an embodiment of the Move Group panel 804, which may include a Group box 812, a memory edit box 814, a memory size box 816, a first radio button 818, and a second radio button 820. As described herein, the Move Group panel 804 allows a user to change the starting address of a group of signals. The Group box 812, which may include a vertical scroll bar 812*a*, presents the starting and ending address of each group of signals, as determined by the communication engine 224. For example, as illustrated, Group 1 has a starting address of 0x10000000 and an ending address of 0x1000000F, Group 2 has a starting address of 0x10000010 and an ending address of 0x10000013, and so on. Nonetheless, the user may change the starting address of one or more of the groups.

More specifically, the user may select, e.g., with the mouse, a group whose starting address is to be changed. Upon selection of a group, such as Group 1, the current is starting address for this group may be displayed in the memory edit box 814. In addition, the memory size box 816 may display the memory size for the selected group. The user then may enter a new starting address by typing, e.g., using the keyboard, the value of the new starting address in the memory edit box 814, thereby overwriting the previous starting address. In addition, by selecting, e.g., with the mouse, the first or second radio buttons 818 and 820, the user can switch between the address ranges utilized by the GPP 136 and the address ranges utilized by the programmable logic device 146, respectively. Accordingly, the user may change the starting address as originally determined and proposed by the communication engine 224 of each group of signals in terms of GPP address space and programmable logic device address space.

A user may choose to move a group based on characteristics of the physical memory, such as cost, speed, whether the memory is single or dual ported, etc.

FIG. 8C illustrates an embodiment of the Reorder Group panel 806, which may include a select group box 822, a signal list box 824, a move up button 826, a move down button 828, a move before button 830, a move after button 832, a first radio button 834 and a second radio button 836. As described herein, the Reorder Group panel 806 allows a user to change the order of signals within one or more of the groups. Each group, moreover, is associated with an address range. Accordingly, by changing the signal order, the starting address of one or more signals within that range may be changed. The select group box 822, which may have a pull-down arrow 822*a*, presents the groups of signals as determined by the communication engine 224. The user may select, e.g., using the mouse, a group whose signal order is to be changed. The selected group, such as Group 3, may be highlighted. The signals associated with the selected group, e.g., Group 3, and their starting addresses are displayed in the signal list box 824 in their current order. As shown, sig9 has a starting address of 0x80000020 and sig3 has a starting address of 0x80000030. To change the order of the signals, and thus the starting addresses, the user selects, e.g., using the mouse, the signal of interest, and manipulates one or more of the buttons 826-832.

Specifically, to move a signal up one place in the order, the user selects, e.g., using the mouse, the desired signal from the signal list box 824, and selects the move up button 826. To move a signal down one place in the order, the user selects the desired signal from the signal list box 824, and selects the move down button 828. To ensure that a first signal is placed before a second signal, the user may select the first signal from the signal list box 824, and then may select a drop down button 830*a* of the move before button 830. In response a list (not shown) of the other signals in this group may be displayed. The user may select the second signal from this list. Similarly, to ensure that a first signal is placed after a second signal, the user may select the first signal from the signal list box 824, and then may select a drop down button 832*a* of the move after button 832. In response, a list (not shown) of the other signals in this group may be displayed. The user may select the second signal from this list.

In addition, by selecting, e.g., with the mouse, the first or second radio buttons 834 and 836, the user can switch between changing the order, and thus the starting address, of signals for address ranges utilized by the GPP 136 and for address ranges utilized by the programmable logic device 146, respectively. Accordingly, the order of signals of a given group and thus their relative starting addresses may be different for the GPP 136 as compared to the programmable logic device 836.

A user may choose to reorder one or more signals in a group based on one or properties of the memory. For example, a user may place signals that are used together close in memory to take advantage of the size of the cache line of the GPP 136. If the GPP 136 has a 16 byte cache line, for example, then placing 4 byte values that are frequently used together may result in fewer memory accesses.

In response to changes made by the user, the communication engine 224 may generate a new determination of the signal groups, the order of signals within the groups, and the memory mappings of the groups and the signals within the groups, among other determinations made by the communication engine 224.

Other embodiments may use different or other GUIs and/or GUI elements may be used. For example, the GUI 800 may display total memory size, memory unused, memory available, etc. The entire memory map, moreover, may be homogenous or heterogeneous, and may have memory with different physical properties.

Figure 7:
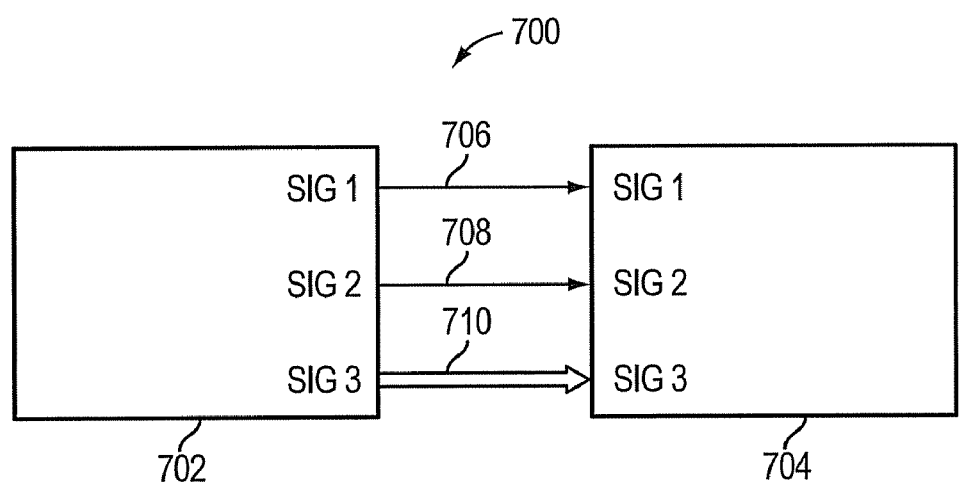

FIG. 7 is an illustration of an exemplary graphical program 700 having a first block 702 coupled to a second block 704. Each block 702, 704 may be a subsystem and thus represent a plurality of interconnected blocks. The first block 702, moreover, may be designated for execution by the GPP 136 of the target processing entity 104, while the second block 704 may be designated for execution by the programmable logic device 146. As shown, first block 702 is connected to second block 704 by three arrows each representing one or more signals and/or mathematical relationships. Specifically, a first arrow (sig1) 706 represents vector data in the form of an unsigned 32-bit integer having a width, which refers to the minimum number of digits or characters that are used when formatting the value, of three. A second arrow (sig2) 708 represents matrix data in the form of an unsigned 16-bit integer of dimensions 4×4. A third arrow (sig3) 710 is a bus, e.g., a collection of various data types and dimensions presented as a group. Suppose also that the signals or mathematical relationships represented by the three arrows 706, 708 and 710 are each updated at different data rates.

The communication engine 224 may produce communication code, executable by the GPP 136 of the target data processing entity 104 and corresponding to the signal or mathematical relationship of arrow 706 (sig1), that:

1. Designates one or more registers on the programmable logic device to store the data element, e.g., an unsigned 32-bit integer.

2. Configures the one or more PCI bus controllers to support the transfer of the data elements to the one or more registers.

3. Establishes one or more semaphores or flags to control the flow of data elements.

4. Checks a semaphore or flag indicating whether the previous data element, e.g., the prior unsigned 32-bit integer, has been read from the one or more registers, and blocks the writing of a new data element to the one or more registers if the prior data element has not yet been read by the programmable logic device 146.

5. Captures a semaphore or flag that controls access to the one or more registers to is prevent the programmable logic device 146 from trying to read from the one or more registers while the GPP 136 is writing a new data element.

6. Writes the new data element to the one or more registers.

7. Sets a semaphore or flag, such as the semaphore or flag of step 3, to indicate that a new data element is in the one or more registers.

8. Releases the semaphore or flag of step 4, thereby allowing the programmable logic device 146 to gain access to the one or more registers and read the new data element.

The communication engine 224 may use a mutual exclusion algorithm, such as Peterson's algorithm, for capturing and releasing the semaphore or flag that controls access to the one or more registers.

The communication engine 224 may produce communication code, executable by the programmable logic device 146 of the plug-in card 158 and corresponding to the signal or mathematical relationship of arrow 706 (sig1), that:

1. Designates one or more registers on the programmable logic device to store the data element, e.g., an unsigned 32-bit integer.

2. Configures the one or more PCI bus controllers to support the transfer of the data elements to the one or more registers.

3. Establishes one or more semaphores or flags to control the flow of data elements.

4. Checks a semaphore or flag indicating whether the previous data element, e.g., the prior unsigned 32-bit integer, has been updated in the one or more registers, and blocks the reading of a new data element from the one or more registers if the data element has not yet been updated by the GPP 136 since the last read.

5. Captures a semaphore or flag that contains access to the one or more registers is to prevent the GPP 136 from trying to write to the one or more registers with the programmable logic device 146 is reading a new data element.

6. Reads the new data element from the one or more registers.

7. Sets a semaphore or flag, such as the semaphore or flag of step 3, to indicate that a new data element in the one or more registers has been read.

8. Releases the semaphore or flag of step 4, thereby allowing the GPP 136 to gain access to the one or more registers and write the new data element.

The reverse situation may apply if the programmable logic device 146 is a writer and the GPP 136 is a reader. Similar steps may be taken for signals in other regions.

The set of signals between the two elements, e.g., the GPP 136 and the programmable logic device 146, may be examined, and may be grouped according to one or more characteristics, such as: sample time of the signals, whether it is reading or writing, data types, and data size and dimensions, etc. Once this is done, each group ("region") may be sent at a time, surrounded by the semaphore code.

The foregoing description has been directed to specific embodiments of the present invention. It will be apparent, however, that other variations and modifications may be made to the described embodiments, with the attainment of some or all of their advantages. For example, the target processing entity may have multiple plug-in boards, each having one or more programmable logic devices. Therefore, it is the object of the appended claims to cover all such variations and modifications as come within the true spirit and scope of the invention.

What is claimed is:

1. A computer-implemented method for configuring a target processing entity having a processor, a memory coupled to the processor and a programmable logic device coupled to the processor, to implement a graphical program representing a procedure, the method comprising:

creating the graphical program at a host computer system that is different from the target processing entity, the graphical program having a plurality of interconnected blocks defining a procedure;

specifying a first portion of the graphical program for execution by the processor of the target processing entity;

specifying a second portion of the graphical program for execution by the programmable logic device of the target processing entity, at least one block of the second portion of the graphical program connected to at least one block of the first portion of the graphical program;

creating a single build file based on the first and second portions of the graphical program, the build file having an executable code section to implement the first portion of the graphical program, a communication interface section to implement the connection between the at least one block of the first portion with the at least one block of the second portion, and a configuration section to implement the second portion of the graphical program;

downloading the single build file from the host computer to the target processing entity;

executing the single build file by the processor of the target processing entity, the executing including:

storing the executable code section for execution by the processor in the memory of the target processing entity;

establishing a communication interface between the processor and the programmable logic device based on the communication interface section; and configuring the programmable logic device with the configuration section; and implementing the graphical program at the target processing entity based on the processing.

2. The computer-implemented method of claim 1 wherein the configuration section of the single build file is in the form of a hardware description language (HDL), and the method further comprising:

converting the HDL into a bit stream for configuring the programmable logic device.

3. The computer-implemented method of claim 2 wherein the single build file further includes a configuration set-up section that specifies a format for the bit stream.

4. The computer-implemented method of claim 1 wherein the programmable logic device is disposed on a plug-in card received in a slot of the target processing entity.

5. The computer-implemented method of claim 4 wherein the plug-in card is coupled to the processor by at least one bus, and the executing includes utilizing the at least one bus to establish the communication interface between the processor and the programmable logic device.

6. The computer-implemented method of claim 4 wherein the plug-in card further includes an on-board memory coupled to the programmable logic device, the first portion of the graphical program includes a plurality of send blocks, and each of the plurality of send blocks of the first portion is coupled to a respective receive block of the second portion, the method further comprising:
organizing the on-board memory into a plurality regions; and
assigning each region of the on-board memory to a given pair of send and receive blocks of the graphical program, further wherein
operations representing each pair of send and receive blocks of the graphical program utilize the assigned region of the on-board memory to share data between the processor and the programmable logic device.

7. The computer-implemented method of claim 6 wherein information regarding the assignment of regions of the on-board memory to operations representing pairs of send and receive blocks of the graphical program is stored in the communication interface section of the single build file.

8. A system comprising:
a target data processing entity including
a processor,
a memory coupled to the processor, and
a programmable logic device coupled to the processor; and
a host computer system including:
a host memory configured to store:
a graphical program having a plurality of interconnected blocks, the graphical program having:
a first portion for execution by the processor of the target data processing entity, and
a second portion for execution by the programmable logic device of the target data processing entity, the second portion of the graphical program including at least one block that is connected to at least one block of the first portion of the graphical program, and
a single build file of the graphical program including:
an executable code section configured to implement the first portion of the graphical program,
a communication interface section to implement the connection between the at least one block of the first portion with the at least one block of the second portion, and
a configuration section to implement the second portion of the graphical program, and
communication logic configured to download the single build file to the target data processing entity,
the processor of the target data processing entity configured to:
execute the single build file to:
store in the memory of the target data processing entity the executable code section for execution by the processor of the target data processing entity,
establish a communication interface between the processor and the programmable logic device based on the communication interface section, and
configure the programmable logic device with the configuration section,
the processor and the programmable logic device configured to cooperate to implement the graphical program at the target processing entity by:
executing the executable code section from the memory using the processor,
executing the programmable logic device as configured, and
the processor and the programmable logic device communicating across the communication interface.

9. The system of claim 8 wherein the single build file further includes a configuration set-up section that specifies a format for a bit stream for configuring the programmable logic device.

10. The system of claim 9 wherein the processor is configured to generate a net list from the configuration section of the single build file in the specified format.

11. The system of claim 10 wherein the target processing entity further includes a device programmer configured to utilize the net list to configure the programmable logic device.

12. The system of claim 8 wherein
the first portion of the graphical program includes a plurality of send blocks, and each of the plurality of send blocks of the first portion is coupled to a respective receive block of the second portion,
the programmable logic device is disposed on a plug-in card received in a slot of the target processing entity, the plug-in card having an on-board memory coupled to the programmable logic device,
the communication interface section of the single build file includes information for organizing the on-board memory into a plurality regions, and assigning each region of the on-board memory to operations representing a given pair of send and receive blocks of the graphical program, and
the processor and the programmable logic device are configured to utilize the assigned regions of the on-board memory to share data.

13. The system of claim 12 wherein target processing entity further includes a bus that interconnects the plug-in card with the processor.

14. A computer-readable medium comprising instructions executable by a host computer, the medium comprising:
instructions to create a graphical program having a plurality of interconnected blocks;
instructions to specify a first portion of the graphical program for execution by a processor of a target processing entity that is different from the host computer;
instructions to specify a second portion of the graphical program for execution by a programmable logic device of the target processing entity, at least one block of the second portion of the graphical program connected to at least one block of the first portion of the graphical program;
instructions to create a single build file based on the first and second portions of the graphical program, the build file having an executable code section, a communication interface section, and a configuration section, the executable code section implementing the first portion of the graphical program, the communication interface section is implementing the connection between the at least one block of the first portion with the at least one block of the second portion, and the configuration section implementing the second portion of the graphical program; and
instructions to download the single build file from the host computer to the target processing entity for execution by the processor of the target processing entity for implementation of the graphical program at the target processing entity by the processor and the programmable logic device.

15. The computer-readable medium of claim 14 wherein the configuration section of the single build file includes at least one of hardware description language (HDL) code, a netlist, and a serial bit stream.

16. The computer-readable medium of claim 14 further comprising:

instructions to identify a type of the programmable logic device of the target processing entity, where the configuration section of the single build file is a bitstream file for configuring the type of the programmable logic device.

* * * * *

UNITED STATES PATENT AND TRADEMARK OFFICE
CERTIFICATE OF CORRECTION

| | |
|---|---|
| PATENT NO. | : 8,387,005 B1 |
| APPLICATION NO. | : 12/326297 |
| DATED | : February 26, 2013 |
| INVENTOR(S) | : Rajiv Ghosh-Roy et al. |

It is certified that error appears in the above-identified patent and that said Letters Patent is hereby corrected as shown below:

In the Specifications

In col. 2, line 31 should read:
to implement ~~is~~ the first portion of the graphical program, a In col. 3, line 51 should read:
programmable logic device may execute as configured such ~~is~~

In col. 4, line 3 should read:
Processor (DSP), which may be coupled to the on-board In col. 5, line 42 should read:
be configured ~~is~~ to write to the computer readable medium In col. 6, line 57 should read:
and arranged to ~~is~~ produce sequential logic circuits. In the In col. 7, line 31 should read:
ing the ~~is~~ blocks.

In col. 9, line 40 should read:
and type of on-board memory 600, the number of DMA con- In col. 11, line 12 should read:
ready, marking the status ~~is~~ of data, such as ready, new, stale In col. 11, line 60 should read:
memory 600 and/or registers on the plug-in board 158 or on Signed and Sealed this
Twenty-fifth Day of June, 2013

Teresa Stanek Rea
*Acting Director of the United States Patent and Trademark Office*

CERTIFICATE OF CORRECTION (continued)
U.S. Pat. No. 8,387,005 B1

In col. 13, line 34 should read:
board memory 600 through a first, ~~TO~~IO, address space, while In col. 13, line 39 should read:
tion of memory ~~is~~ addresses between the IO address space and In col. 14, line 13 should read:
region (16-bit quantities) may have ~~is~~ its data at 0x10000030

In col. 15, line 26 should read:
tion of a group, such as Group 1, the current ~~is~~ starting address In col. 17, line 16 should read:
one or more registers to ~~is~~ prevent the programmable logic In col. 17, line 49 should read:
one or more registers ~~is~~ to prevent the GPP 136 from trying to In the Claims In col. 20, line 57 should read:
section ~~is~~ implementing the connection between the at